UNITED STATES PATENT OFFICE.

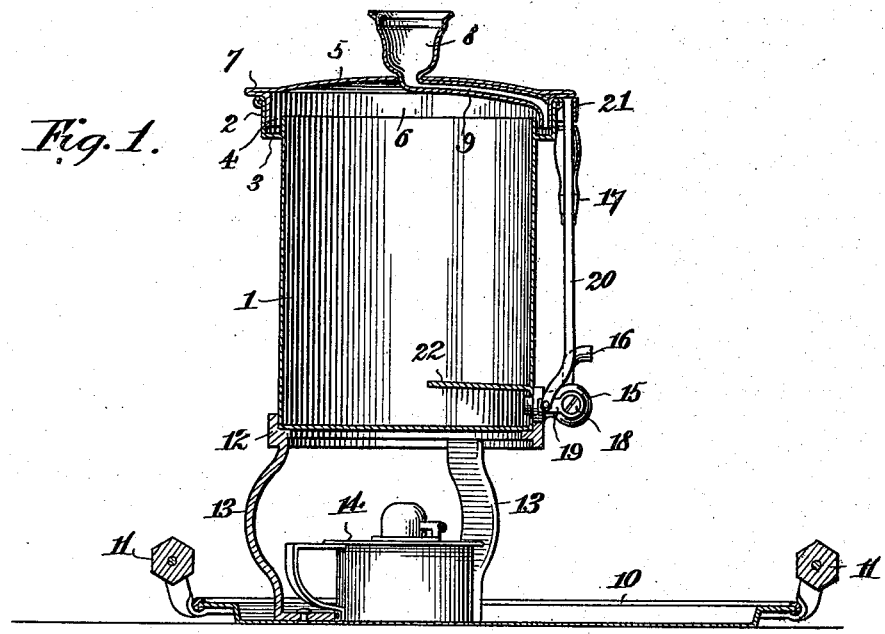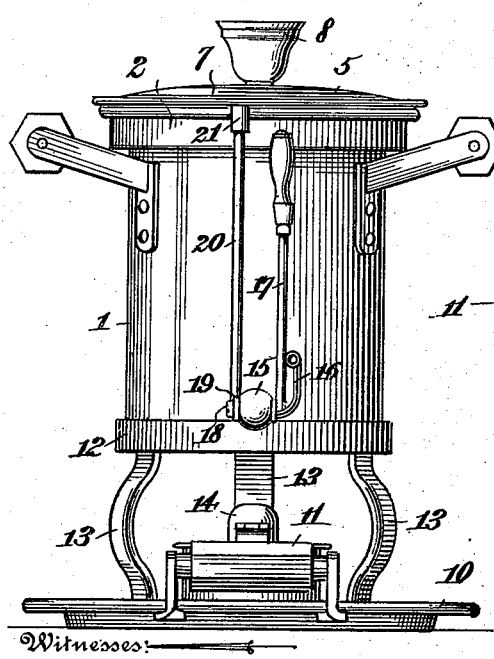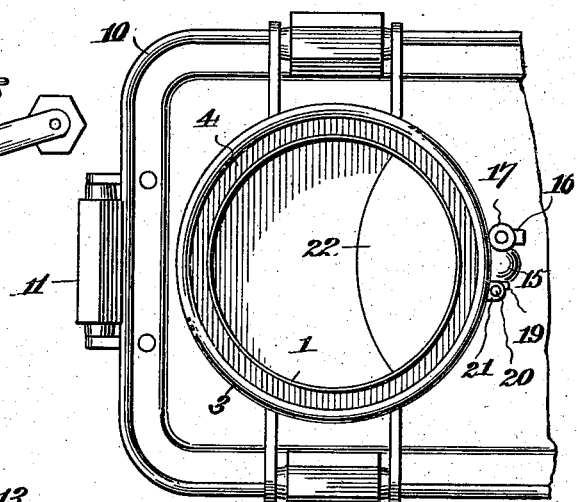

MIGUEL JAUME, OF NEW YORK, N. Y.

WATER-SEAL POT.

1,223,174.  Specification of Letters Patent.  Patented Apr. 17, 1917.

Application filed April 18, 1916. Serial No. 91,955.

*To all whom it may concern:*

Be it known that I, MIGUEL JAUME, a subject of the King of Spain, residing at New York, in the county of New York and State of New York, have invented new and useful Improvements in Water-Seal Pots, of which the following is a specification.

This invention relates to coffee pots and has for its principal object the provision of a device of this character which will include a boiler or receptacle having means whereby after the coffee is agitated and properly commingled with the water in the container, the latter may be effectually sealed from the atmosphere so as to permit the essence of the coffee which ordinarily goes off into the atmosphere, to be confined within the container.

A still further object of the invention resides in the provision of a coffee pot consisting of a boiler or container including a cover and means for forming a water-seal between the body of the container and the cover, a valved draw-off and mechanism adapted to be controlled during the operation of opening the valve so as to permit of a free circulation of air in the container and thereby prevent the natural tendency of the coffee to scatter about the water and minimize the possibility of the valve becoming unduly clogged while the liquid is passing therefrom.

A still further object of the invention resides in the provision of a coffee pot including a valved draw-off opening to the container but normally closed therefrom and means within the container located in relatively close proximity to the valve so that when the container is opened to the atmosphere, a peculiar circulation of air will be established around the valve so as to ward off the tendency of the ground particles of the coffee bean to accumulate in the presence of the valve.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claim may be resorted to when desired.

In the drawings:—

Figure 1 is a longitudinal section through the device.

Fig. 2 is a front view thereof.

Fig. 3 is a plan view of the container with the cover removed.

The coffee pot herein illustrated consists of a container or boiler 1, provided at its upper end with an annular collar 2, having an offset base 3, which is continued into the side walls of the container 1. The said side walls of the container rise above the portion 3, of the collar, and on reference to Fig. 1, it is observed that the sides of the collar are spaced from the adjacent sides of the container so as to define therewith a continuous annular channel or well 4. A cover 5, is removably fitted to the container and it carries a depending vertical flange 6, and a horizontal flange 7, the latter resting upon the upper edge of the collar 2, when the cover is closed. The flange 6, extends into the well or channel 4, and it is spaced from the walls of the container 1. At the center, the cover is provided with a combined knob and filling cup 8, the base of which has connection with a filling tube 9. The said tube is secured in any suitable well known manner to the under side of the cover and the free outer end of said tube is extended at an angle so as to come into the well 4, at a point below the upper end of the container. Water may be poured into the mentioned cup shaped knob whereby it will, in turn, gravitate or flow to the well. In so doing, the water which flows from the tube 9, and into the channel or well forms a water seal between the container and said cover, preventing the essence of the coffee which is contained in the passing vapors, from being lost into the atmosphere. In other words, the arrangement is such that the rising vapors cannot pass from the container and they are consequently made to cycle around the container and through the liquid therein, causing the essence of the coffee to be properly preserved as will be understood.

The container may be used in connection with an ornamental tray 10, having handles 11, at its ends. Rising from the tray, near one end thereof, is an annular support 12, on which the container 1, may be placed. The said support is connected to the tray by spaced legs 13, between which an alcohol burner 14, or the like, may be placed and thereby positioned beneath the center of the container.

The container is provided with a draw-off valve 15, having a discharge nozzle 16, and a lever 17. The nozzle is normally disposed in a substantially horizontal position. The lever is normally disposed in a substantially vertical position against one side of the container. The stem 18, of the valve, is provided with a crank arm 19, to which the lower end of a rod 20, finds pivotal connection. The upper end of the rod freely passes through a guide member 21, secured to the container at a point immediately under the flange 7, of the container. Located within the container and above the valve is a baffle plate 22.

In use, ground coffee is placed in the container in a body of water therein. Water is then poured into the cup 8, in order that it may flow to the well 4, to form therein, the mentioned water seal to positively close the container to the atmosphere. The container is then subjected to the action of heat and the water permitted to boil. In order to prevent the ground particles of coffee from being unduly disturbed in the presence of the heat, provision is made of the baffle 22, and by means of the rod 20, it is evident that during the operation of opening the valve, but immediately prior to the opening thereof, the cover will be raised at one side from the described water seal, permitting the air from the outside to enter the container and freely circulate therein. The circulation is found to be rather peculiar around the baffle and in proximity to the valve and the tendency is to throw off the fine or ground particles of coffee and to keep the liquid clear around the valve. The venting permits the air to take the place of the displaced liquid as it flows from the valve and a free and uninterrupted flow is had. On returning the latter to its normal vertical position the cover is again brought down into the liquid in the well 4, and a seal established.

The container is provided at diametrically opposite sides with handles in order that the structure may be conveniently carried from place to place as the occasion necessitates.

What is claimed as new is:—

1. A coffee pot comprising a container, a closure for the container operative for venting or sealing the container, a draw-off valve for the discharge of the coffee from the container, and means operated by the movement of the valve for operating said closure for venting the container when the valve is opened and sealing the container when the valve is closed.

2. A coffee pot comprising a container provided with a sealing well, a cover movable vertically into and out of sealing engagement with the well, a draw-off valve for the discharge of the coffee from the container, and means operated by the movement of the valve for raising the cover so as to vent the container when the valve is opened and lowering the cover so as to seal the container when the valve is closed.

3. A coffee pot comprising a container provided with a sealing well, a cover movable vertically into and out of sealing engagement with the well, a combined filling and vent tube carried by the cover and having one end arranged for communication with the atmosphere and the other end arranged to be sealed by the well when the cover is in closed position, a draw-off valve for the discharge of the coffee from the container, and means operated by the opening and closing movements of the valve for respectively raising and lowering the cover and thereby moving the second-named end of the tube respectively out of and into sealing connection with the well.

4. A coffee pot comprising a container provided with a sealing well, a cover movable vertically into and out of sealing engagement with the well, a rotary draw-off valve, and a rod arranged to be raised and lowered by the opening and closing movements of the valve so as to raise and lower the cover and thereby vent or seal the container.

5. A coffee pot comprising a container provided at its lower portion with a discharge outlet and at its upper portion with a sealing well, a draw-off valve for the discharge of the coffee from the container through said outlet, a cover for closing the container, said cover being movable vertically into and out of sealing engagement with the well, means operated by the opening and closing movements of the valve for respectively raising and lowering the cover and thereby respectively venting or sealing the container, and an imperforate horizontal baffle plate disposed within the container and arranged to overhang and project inwardly beyond the line of said discharge outlet.

6. A coffee pot comprising a container having a well located at its edge, a cover for the container and having a flange which enters the well, a valve attached to the container and having a crank mounted on its stem, and a rod connected with the crank and guided under the cover and adapted to lift the flange in the well when the valve stem is turned to open the valve.

In testimony whereof I affix my signature in presence of two witnesses.

MIGUEL JAUME.

Witnesses:
 ANNA V. DOYLE,
 CHRIS FEINLE, Jr.

Copies of this patent may be obtained for five cents each, by addressing the "Commissioner of Patents, Washington, D. C."